(12) United States Patent
Kim et al.

(10) Patent No.: US 7,493,120 B2
(45) Date of Patent: Feb. 17, 2009

(54) METHOD AND APPARATUS FOR GENERATING HANDOVER NEIGHBOR LIST IN A CELLULAR MOBILE COMMUNICATION SYSTEM

(75) Inventors: Mi-Jung Kim, Seongnam-si (KR); Hyeon-Mi Seo, Seoul (KR); Hae-Dong Jin, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 317 days.

(21) Appl. No.: 10/740,890

(22) Filed: Dec. 22, 2003

(65) Prior Publication Data

US 2005/0048974 A1 Mar. 3, 2005

(30) Foreign Application Priority Data

Sep. 1, 2003 (KR) ...................... 10-2003-0060711

(51) Int. Cl.
 *H04Q 7/20* (2006.01)
(52) U.S. Cl. .................. 455/436; 455/437; 455/446; 455/424; 455/509
(58) Field of Classification Search .......... 455/436, 455/437, 446, 509, 424
See application file for complete search history.

(56) References Cited

U.S. PATENT DOCUMENTS

| | | | | |
|---|---|---|---|---|
| 5,590,397 A | * | 12/1996 | Kojima ...................... 455/417 |
| 5,613,213 A | * | 3/1997 | Naddell et al. ........... 455/435.2 |
| 5,854,981 A | * | 12/1998 | Wallstedt et al. ............ 455/439 |
| 5,974,318 A | * | 10/1999 | Satarasinghe ................ 455/436 |
| 6,134,443 A | * | 10/2000 | Spann et al. ................. 455/450 |
| 6,192,244 B1 | * | 2/2001 | Abbadessa ................... 455/436 |
| 6,275,703 B1 | * | 8/2001 | Kalev ........................ 455/436 |
| 6,487,421 B2 | * | 11/2002 | Hess et al. ................ 455/550.1 |
| 6,526,286 B2 | * | 2/2003 | Wan ........................... 455/515 |
| 6,725,043 B2 | * | 4/2004 | Bonta et al. .................. 455/437 |
| 2002/0006807 A1 | * | 1/2002 | Mantyjarvi et al. ......... 455/550 |
| 2002/0068566 A1 | * | 6/2002 | Ohlsson et al. ............. 455/436 |
| 2002/0107051 A1 | * | 8/2002 | An ............................. 455/564 |
| 2002/0168984 A1 | * | 11/2002 | Wallentin .................... 455/452 |
| 2003/0078043 A1 | * | 4/2003 | Horwath et al. ............. 455/436 |
| 2003/0186693 A1 | * | 10/2003 | Shafran et al. .............. 455/423 |
| 2004/0121770 A1 | * | 6/2004 | Tigerstedt et al. ........... 455/436 |
| 2004/0235478 A1 | * | 11/2004 | Lindquist et al. ............ 455/440 |
| 2004/0266442 A1 | * | 12/2004 | Flanagan et al. ............ 455/445 |
| 2005/0009531 A1 | * | 1/2005 | Lindquist et al. ......... 455/452.2 |

* cited by examiner

*Primary Examiner*—Lester Kincaid
*Assistant Examiner*—Diego Herrera
(74) *Attorney, Agent, or Firm*—Roylance, Abrams, Berdo & Goodman, L.L.P.

(57) ABSTRACT

A method and apparatus for generating a handover neighbor list of base stations capable of communicating with a mobile terminal in a cellular mobile communication system. A UMTS RAN manager (URM) collects handover attempt count and handover ratio data as handover statistical information of a source base station and determines rankings of target base stations in order of handover frequency from the base station according to the handover attempt count or the handover ratio. The URM then generates a neighbor list of the source base station in order of high ranking. The proposed method and apparatus reduces overhead due to cell searching in performing handover.

14 Claims, 7 Drawing Sheets

| HANDOVER ANALYSIS | | | | |
|---|---|---|---|---|
| CURRENT BS'S POSITION | RNC_00, CELL = 0 | | | POSITION CHANGE |

Analyzed Result / Graph

| TARGET BS'S POSITION | DAILY AVERAGE ATTEMPT COUNT | RATIO (%) | ATTEMPT COUNT-BASED RANKING | RATIO-BASED RANKING |
|---|---|---|---|---|
| RNC=15,CELL=0 | 8 | 100.0 | 0 | 0 |
| RNC=0,CELL=1 | 3 | 80.0 | 1 | 1 |
| RNC=0,CELL=0 | 1 | 0.0 | 2 | 2 |

RANKING CRITERION SELECTION   ⊙ Attempt Count   ○ Ratio   OK

CONNECTED TO URM     LAST UPDATED TIME = 2003/5/30/15:55:0

HANDOVER ANALYSIS

CURRENT BS'S POSITION: RNC_00, CELL = 0

POSITION CHANGE

Analyzed Result | Graph

| TARGET BS'S POSITION | DAILY AVERAGE ATTEMPT COUNT | RATIO (%) | ATTEMPT COUNT-BASED RANKING | RATIO-BASED RANKING |
|---|---|---|---|---|
| RNC=15,CELL=0 | 8 | 100.0 | 0 | 0 |
| RNC=0,CELL=1 | 3 | 80.0 | 1 | 1 |
| RNC=0,CELL=0 | 1 | 0.0 | 2 | 2 |

RANKING CRITERION SELECTION ● Attempt Count ○ Ratio

CONNECTED TO URM     LAST UPDATED TIME = 2003/5/30/15:55:0     OK

FIG.4

METHOD AND APPARATUS FOR GENERATING HANDOVER NEIGHBOR LIST IN A CELLULAR MOBILE COMMUNICATION SYSTEM

PRIORITY

This application claims priority under 35 U.S.C. § 119 to an application entitled "Method and Apparatus for Generating Handover Neighbor List in a Cellular Mobile Communication System" filed in the Korean Intellectual Property Office on Sep. 1, 2003 and assigned Ser. No. 2003-60711, the contents of which are incorporated herein by reference.

BACKGROUND OF THE INVENTION

1. Field of the Invention:

The present invention relates generally to a cellular mobile communication system, and in particular, to a method and apparatus for generating a handover neighbor list of base stations capable of communicating with a mobile terminal.

2. Description of the Related Art:

In general, a cellular mobile communication system divides its entire service area into a plurality of base station (BS) areas to form cells which are service areas of relatively smaller size than the entire service area, and controls such base stations on a centralized basis with a switching system, so that a subscriber can continue a call seamlessly using a mobile terminal even while moving between cells. When a mobile terminal travels from a current cell of a particular base station to a new cell in the cellular system, a handover occurs to continue a call. Establishment of a new channel due to the handover is referred to as an "ADD," while release of an existing channel due to the handover is referred to as a "DROP."

Handovers can exhibit different efficiencies in terms of reliability of call continuity and system load according to the method used to perform the handover, and implementation contents. A handover method can be categorized into two types: a soft handover and a hard handover. The soft handover is a make-before-cut method, which is a typical handover scheme for a code division multiple access (CDMA) system, in which a new call is made before a current call is cut, while the hard handover is a cut-before-make method in which a current call is cut before a new call is made. When a handover is required, the CDMA system first performs the soft handover. However, in some cases, the CDMA system guarantees continuity of a call through hard handover.

In the CDMA system, base stations are identified by pilot signals transmitted over a code channel. A pilot signal transmitted over a pilot channel is spread by a pseudo-random noise (PN) code, known as a non-modulated direct-sequence signal, which is continuously broadcast by each CDMA base station. Each base station uses a unique time offset of a PN code (hereinafter referred to as a "PN offset"). A mobile terminal acquires timing of a forward CDMA channel by the pilot signal, measures signal strengths between base stations and compares the signal strengths in order to determine the time when a handover is required. Searching pilot signals from all the base stations to determine handover is very inefficient, causing a waste of time. Therefore, a mobile terminal manages a neighbor list specifying pilot signals (specifically, PN offsets) from base stations which are expected to be able to communicate with the mobile terminal.

Handover is a procedure performed as a mobile terminal moves from one cell to another cell. Therefore, a base station controller (BSC) approves handover only to the base stations having pilot signals in the neighbor list, for a mobile terminal requesting the handover. A typical neighbor list is ranked in view of quality of pilot signals, e.g., carrier-to-interference ratio (C/I). In another case, the typical neighbor list is manually made by a system operator.

Managing these neighbor lists is undesirable, however, because they cannot reflect various CDMA characteristics, such as regional characteristic, receiver type and capability of simultaneously demodulating multiple signals. Therefore, there is a demand for a method of determining a neighbor list of base stations which are expected to be able to best communicate with a mobile terminal, in consideration of the form in which handover of the mobile terminal actually occurs.

SUMMARY OF THE INVENTION

It is, therefore, an object of the present invention to provide a method and apparatus for managing a neighbor list for handover in a cellular mobile communication system.

It is another object of the present invention to provide a method and apparatus for generating a neighbor list by extracting rankings of handover target base stations based on handover statistical information in a cellular mobile communication system.

To achieve the above and other objects, there is provided a method for generating a handover neighbor list in a cellular mobile communication system. The method comprises collecting handover statistical information from a source base station, determining rankings of target base stations in order of handover frequency from the base station according to the handover statistical information, and generating a neighbor list, ranked according to the handover statistical information, of the source base station.

To achieve the above and other objects, there is provided an apparatus for generating a handover neighbor list in a cellular mobile communication system. The apparatus comprises a statistics block for collecting handover statistical information of a source base station, a handover analysis block for determining rankings of target base stations in order of handover frequency from the base station according to the handover statistical information, and a neighbor list generation block for generating a neighbor list, which is ranked according to the handover statistical information, of the source base station.

BRIEF DESCRIPTION OF THE DRAWINGS

The above and other objects, features and advantages of the present invention will become more apparent from the following detailed description when taken in conjunction with the accompanying drawings in which:

FIG. 4 is a display screen illustrating handover statistical information for target base stations;

DETAILED DESCRIPTION OF THE PREFERRED EMBODIMENT

Figure 1:
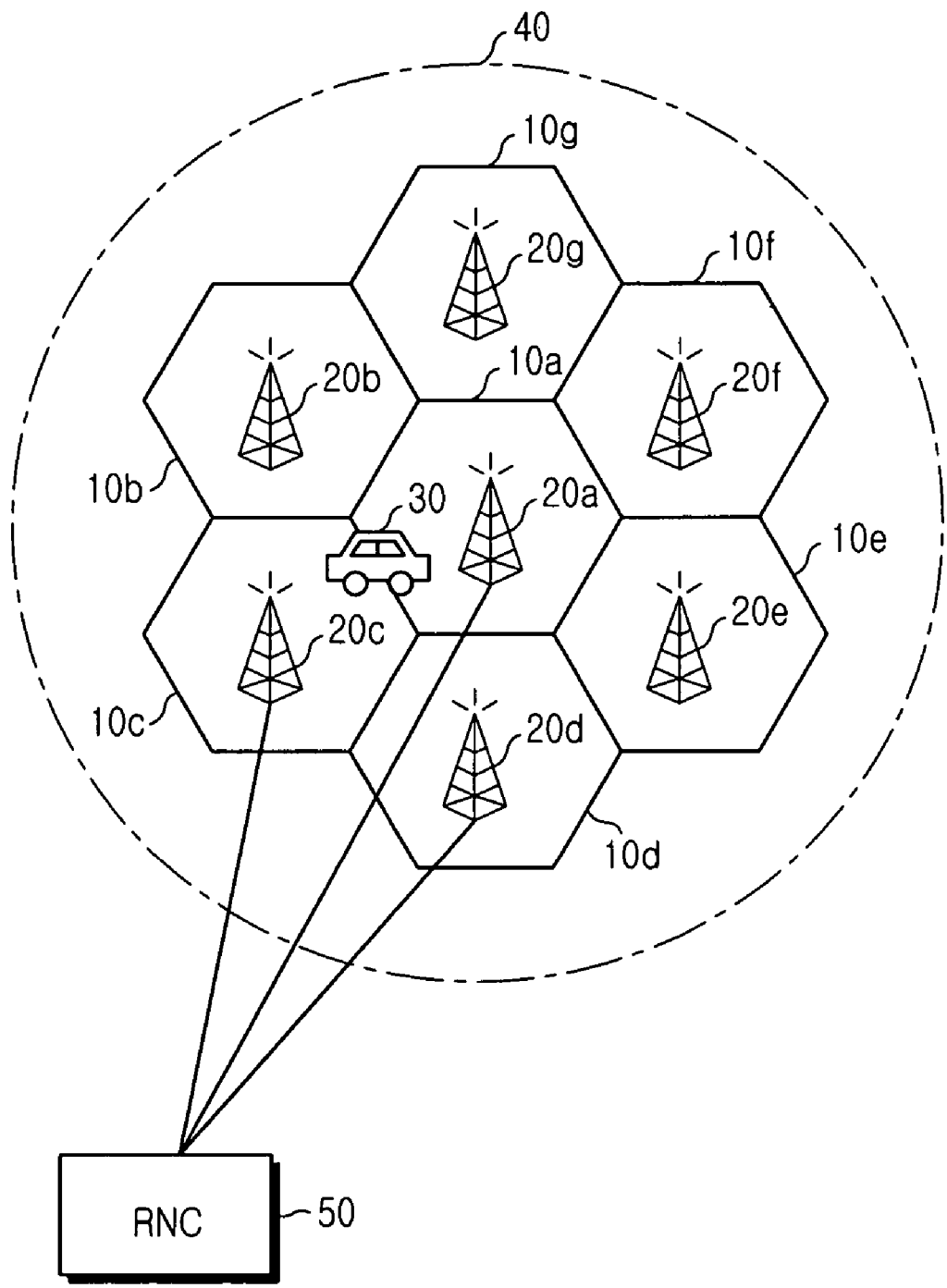
FIG. 1 illustrates a configuration of a typical cellular mobile communication network.

A preferred embodiment of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

FIG. 1 illustrates a configuration of a typical cellular mobile communication network. Referring to FIG. 1, an entire service area 40 of a mobile communication network is divided into a plurality of neighboring cells 10a to 10g. Although the cells 10a to 10g are schematized in the form of a hexagon, they actually have irregular shapes according to the strength of the transmitted electromagnetic waves and arrangement of obstacles. In most cases, the cells 10a-10g overlap with their neighboring cells.

The cells 10a to 10g are associated with corresponding base stations 20a to 20g that provide a communication service to a mobile terminal 30 using a traffic channel and a control channel. The base stations 20 are connected to another network via a network element 50, called a base station controller (BSC) or a radio network controller (RNC). The radio network controller (RNC) 50 and the base stations (BSs) 20 constitute a radio access network (RAN).

The mobile terminal 30 can move through the cells 10a to 10g after performing call setup. Every time the mobile terminal 30 passes through each cell border, a soft or hard handover occurs, and the handover (soft or hard) is controlled by the radio network controller 50.

Figure 2:
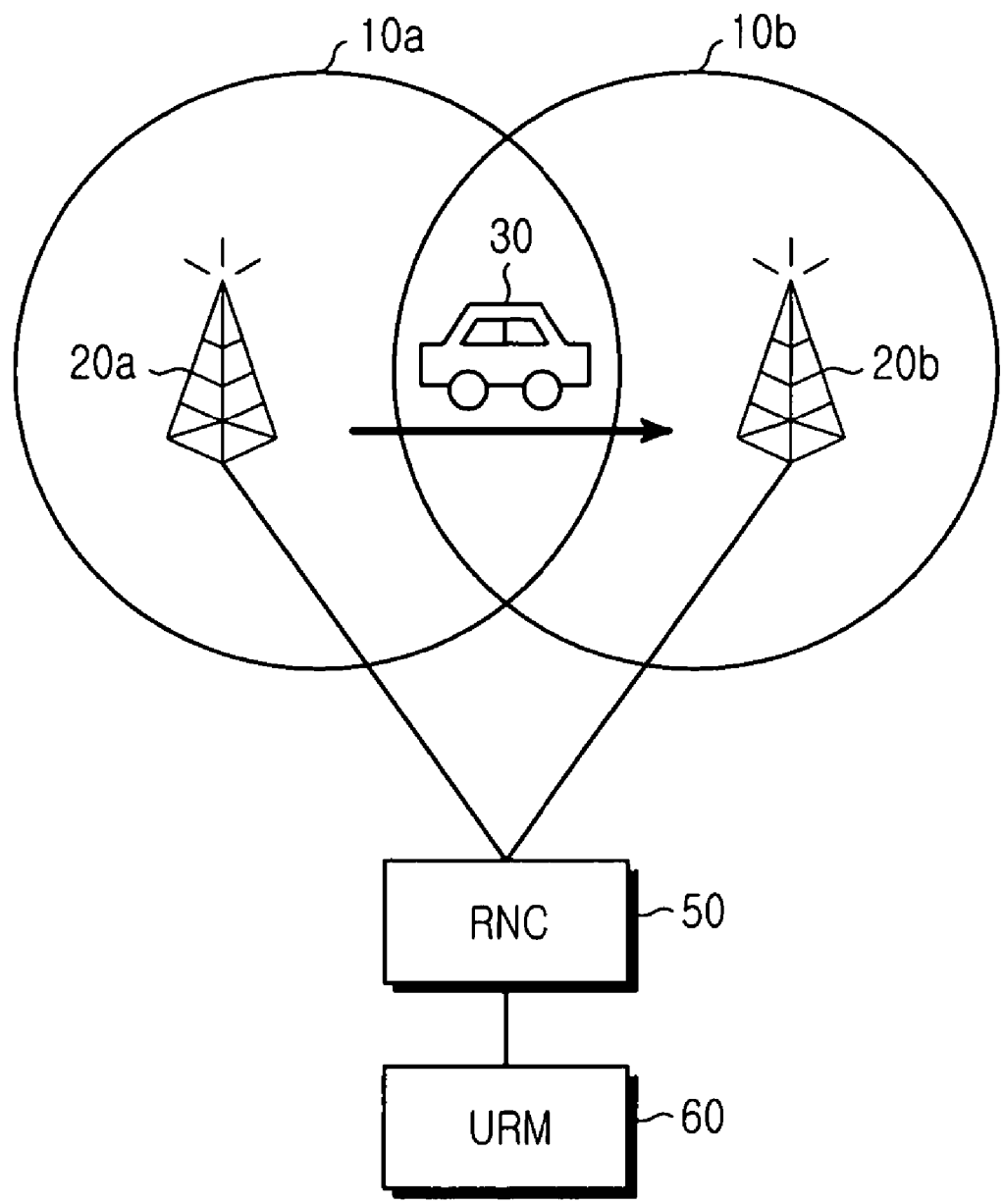
FIG. 2 illustrates cell-to-cell movement of a mobile terminal in a typical cellular mobile communication system.

FIG. 2 illustrates cell-to-cell movement of a mobile terminal in a typical cellular mobile communication system. Referring to FIG. 2, a mobile terminal 30 is moving from an area where a first cell 10a, belonging to a first base station 20a, overlaps with a second cell 10b, belonging to a second base station 20b. The mobile terminal 30 is moving from the first cell 10a towards the second cell 10b. The first base station 20a and the second base station 20b can be associated with either the same radio network controller 50, or different radio network controllers 50. Herein, the base stations 20a and 20b are connected to the same radio network controller 50.

With reference to FIG. 2, a handover procedure due to movement of the mobile terminal 30 will be described. It will be assumed herein that a soft handover can be supported in an overlapping area of the cells 10a and 10b.

In the overlap area, the mobile terminal 30 communicates with the first base station 20a through a traffic channel connected thereto. At this point, an active list of the mobile terminal 30 includes only the first base station 20a. The mobile terminal 30 measures the strengths of pilot signals that can be detected periodically, or when the strength of the pilot signal from the first base station 20a (with which it is currently in communication) is lower than, or equal to, a predetermined handover threshold. The mobile terminal 30 measures the pilot signals from both BS 20a and BS 20b. The mobile terminal 30 reports the measured values to the radio network controller 50 via the first base station 20a by transmitting the measured values on a pilot strength measurement message (PSMM). The PSMM message includes strengths of pilot signals from at least the first and second base stations 20a and 20b.

The radio network controller 50 determines at least one base station with which the mobile terminal 30 can communicate, by consulting the pilot signal strengths included in the PSMM message. If the pilot signal strengths are all higher than or equal to a predetermined ADD threshold, the radio network controller 50 directs the mobile terminal 30 to establish traffic channels to both the base stations 20a and 20b. The mobile terminal 30 then combines signals from the two base stations 20a and 20b, and the radio network controller 50 selects one of the signals received from the mobile terminal 30 via the two base stations 20a and 20b. At this point, an active list of the mobile terminal 30 includes both the two base stations 20a and 20b.

If the strength of a pilot signal from the first base station 20a, measured by the mobile terminal 30, becomes lower than or equal to a predetermined DROP threshold as the mobile terminal 30 goes deep into a service area of the second base station 20b, the radio network controller 50 directs the mobile terminal 30 to drop (or release) the traffic channel connected to the first base station 20a. The mobile terminal 30 then communicates with only the second base station 20b through a traffic channel connected thereto. At this point, an active list of the mobile terminal 30 includes only the second base station 20b.

In the aforementioned handover procedure, in order to generate the PSMM message, the mobile terminal 30 consults a neighbor list previously received from a system to measure only pilot signals included in the neighbor list. The neighbor list includes pilot signals from target cells to which the mobile terminal 30 can be handed over from the current cell, so that the mobile terminal 30 can perform cell searching more efficiently.

The neighbor list is generated and managed by a management system (not shown) that can be connected via the radio network controller 50. Particularly, in a universal mobile telecommunication service (UMTS) ( ) system based on global system for mobile communication (GSM), which is a European $3^{rd}$ generation (3G) mobile communication system employing a wideband code division multiple access (WCDMA) modulation scheme, the management system is called a UMTS RAN manager (URM).

The URM manages operations of at least one radio network controller and its affiliated base stations, and collects various kinds of statistical information. Handover statistical information is very important. The handover statistical information includes, but is not limited to, a handover attempt count and a handover ratio. The "handover attempt count" refers to how many times a mobile terminal in communication with a corresponding (or source) base station has attempted handover to a target base station, and the "handover ratio" refers to the ratio at which a mobile terminal in communication with a corresponding base station successfully performs handover after attempting handover to a target base station.

The handover statistical information is periodically collected, and actual network environment and radio wave environment is reflected therein. The preferred embodiment of the present invention determines rankings of handover-available neighbor base stations which are controlled according to the handover statistical information, and generates a neighbor list which reflects these rankings.

Figure 3:
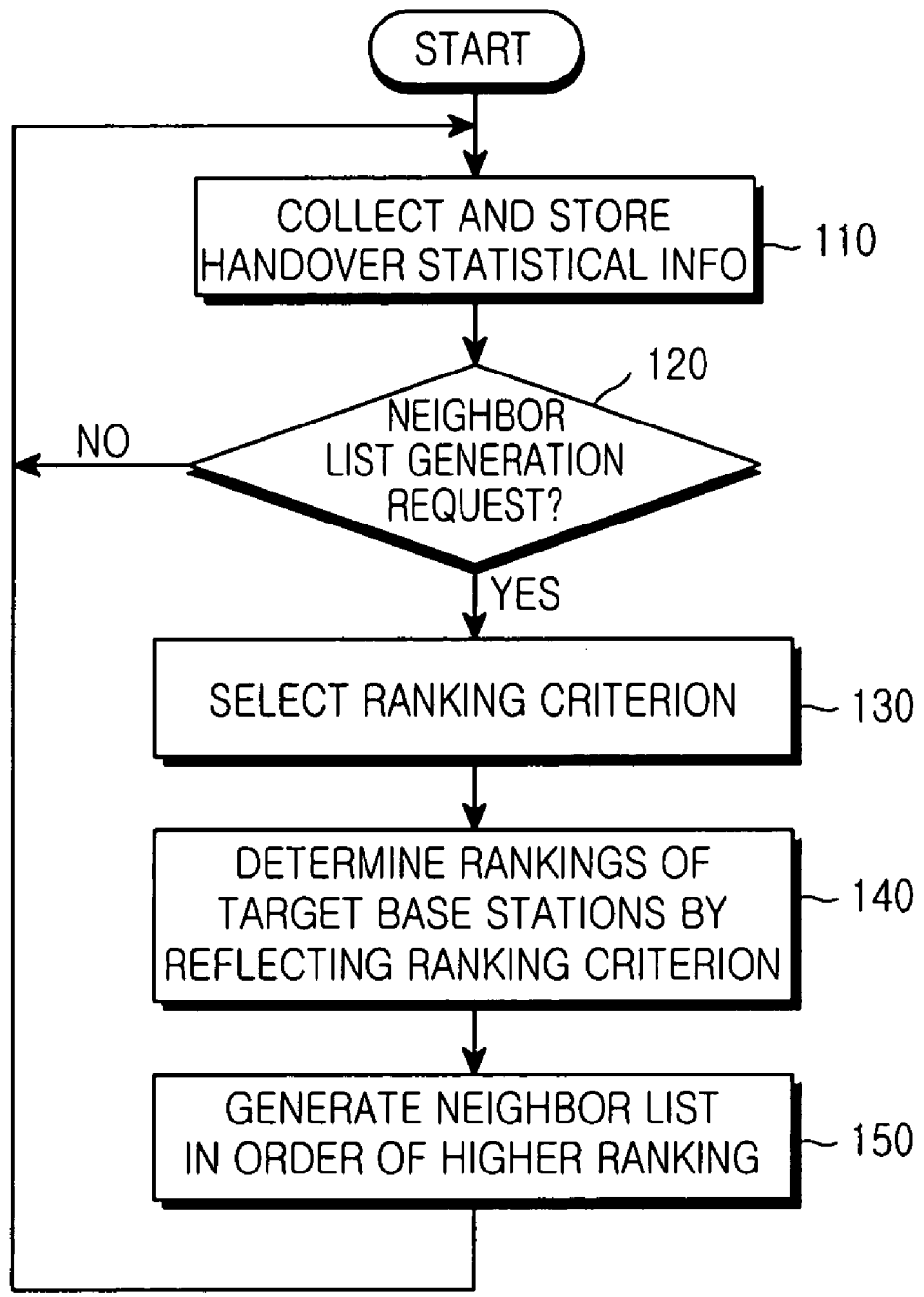
FIG. 3 is a flowchart illustrating an operation of generating a neighbor list according to an embodiment of the present invention.

FIG. 3 is a flowchart illustrating an operation of generating a neighbor list according to an embodiment of the present invention. Referring to FIG. 3, in step 110, a URM collects from base stations handover statistical information for handover to each of several target base stations periodically, or when at least one condition is satisfied, and then stores the collected handover statistical information. The handover statistical information includes information on a handover attempt count and a handover ratio. If a neighbor list generation request for a particular base station is received from a user in decision step 120 ("Yes" path from decision step 120), a ranking criterion is selected at the user's request in step 130. The ranking criterion can bethe handover attempt count or handover ratio.

In step 140, the URM determines rankings of target base stations in order of high handover attempt count or high handover ratio, according to the handover attempt count or handover ratio of the requested base station. In step 150, the URM generates a neighbor list that includes a predetermined number of target base stations in order of the high rankings determined above.

For the user's convenience, the URM displays a procedure for creating a neighbor list with a graphic user interface (GUI). The operation of generating a neighbor list will now be described with reference to drawings illustrating the display screens (FIGS. 4-6).

FIG. 4 is a display screen illustrating handover statistical information for target base stations. As illustrated, target base stations for a cell 0 under RNC 00 (RNC 00/cell 0) includes a cell 0 under RNC 15, and cells 1 and 0 under RNC 0. For handover from RNC 00/cell 0 to RNC 15/cell 0, the average daily handover attempt count is 8 and the handover ratio is 100%. For handover from RNC 00/cell 0 to RNC 0/cell 1, the average daily handover attempt count is 3 and the handover ratio is 80%. For handover RNC 00/cell 0 to RNC 0/cell 0, the average daily handover attempt count is 1 and the handover ratio is 0%.

Figure 5:
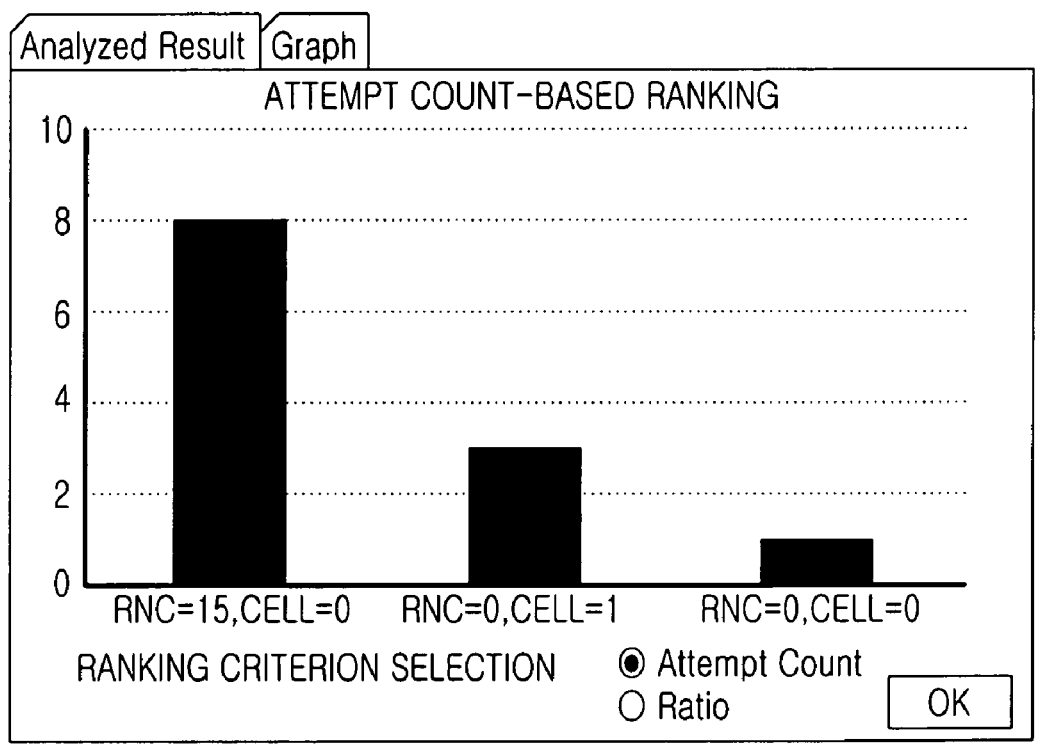
FIG. 5 is a display screen illustrating rankings of target base stations with respect to a handover attempt count.
Figure 6:
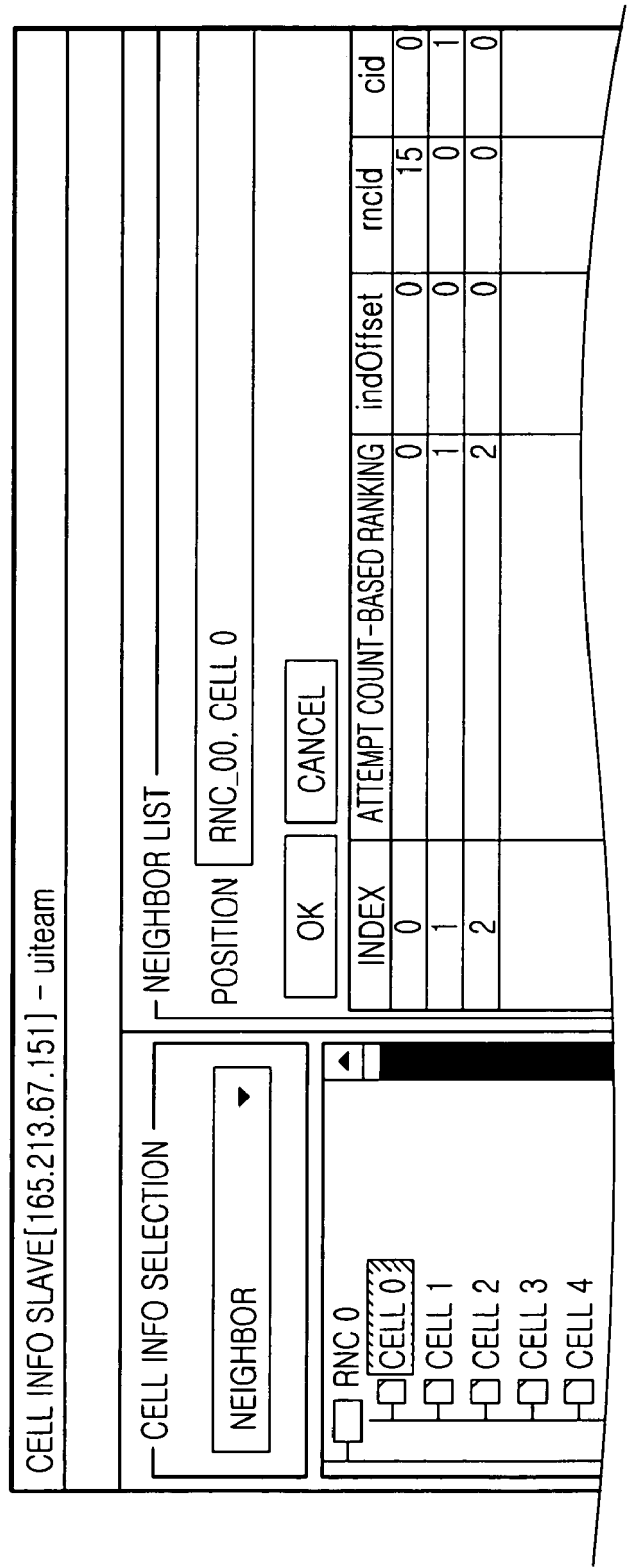
FIG. 6 is a display screen illustrating a neighbor list generated according to an attempt count-based ranking.

FIG. 5 is a display screen illustrating rankings of target base stations in the case where the handover attempt count is selected as the ranking criterion. As illustrated, a ranking based on the handover attempt count data previously generated is highest at RNC 15/cell 0, and lowest at RNC 0/cell 0.

In the display screens illustrated in FIGS. 4 or 5, if a user selects a handover attempt count or handover ratio as the ranking criterion and then clicks an OK button, the URM displays a neighbor list generated according to the corresponding ranking. FIG. 6 is a display screen illustrating a neighbor list generated according to the handover attempt count-based ranking. As illustrated in FIG. 6, a neighbor list of RNC 00/cell 0 includes RNC 15/cell 0, RNC 0/cell 1, and RNC 0/cell 0, in that order.

Figure 7:
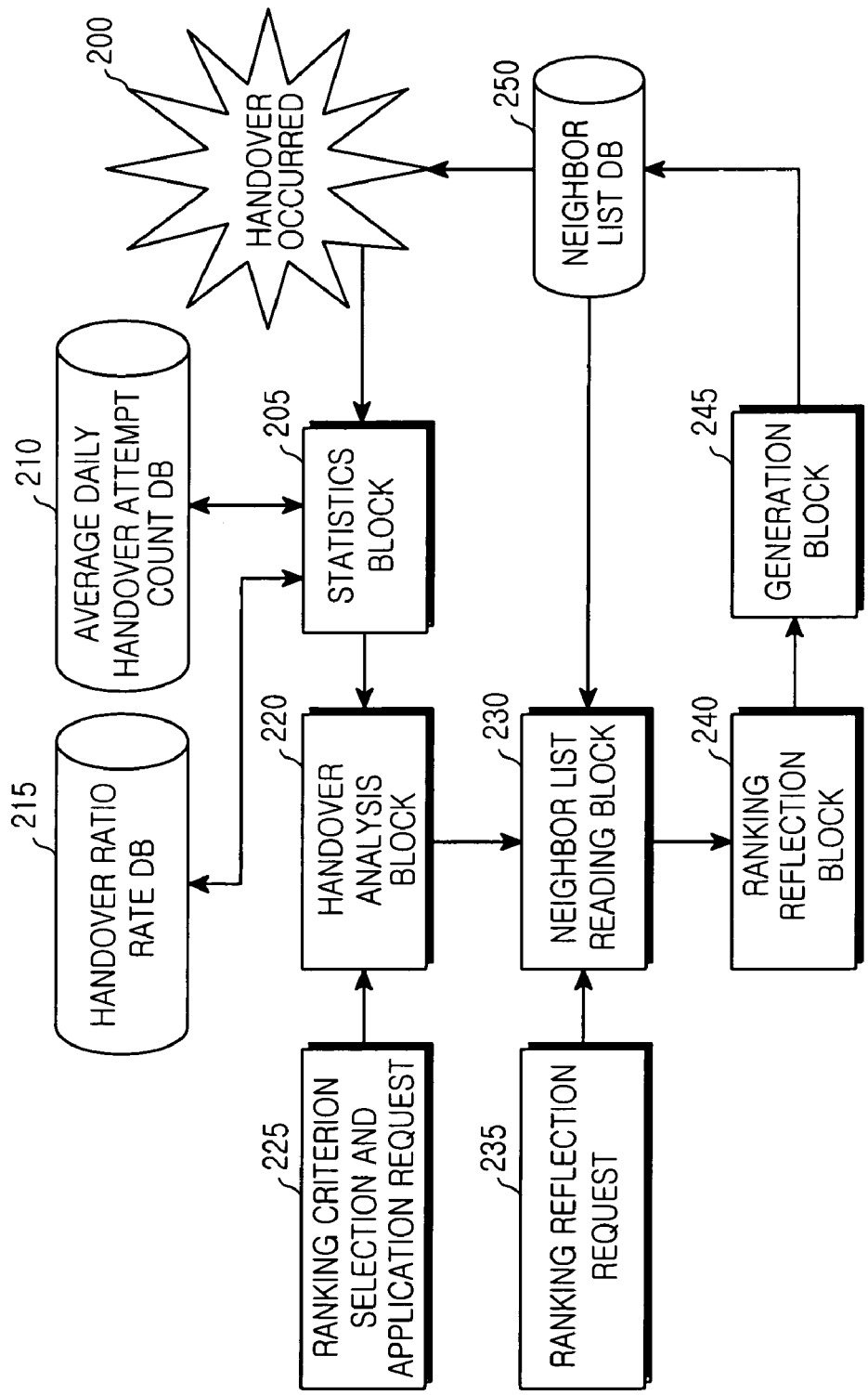
FIG. 7 illustrates a structure of a universal mobile telecommunication service RAN manager (URM) for generating a handover neighbor list according to an embodiment of the present invention.

FIG. 7 illustrates a structure of a URM for generating a handover neighbor list according to an embodiment of the present invention. Referring to FIG. 7, every time handover from a source base station to a target base station occurs (see element 200), a statistics block 205 increases the handover attempt count in an average daily handover attempt count database 210 by one, and if the handover is performed successfully, the statistics block 205 updates and stores the handover ratio of the source base station in a handover ratio database 215. In another case, the statistics block 205 periodically collects the handover attempt count and handover ratio from each base station, and stores the received information in the databases 210 and 215.

A handover analysis block 220 analyzes the handover attempt count and handover ratio received through the statistical block 205, and determines rankings of the target base stations according to the analyzed handover attempt count and handover ratio. Handover statistical information for a currently unused base station is excluded from ranking determination. If there are at least two base stations having the same ranking, rankings of the corresponding base stations are determined according to different ranking criterions.

Upon receiving a handover ranking criterion selection and application request 225, the handover analysis block 220 outputs a ranking according to the corresponding ranking criterion. Upon receiving a ranking reflection request 235, a neighbor list reading block 230 reads a previously formed neighbor list from a neighbor list database 250, or generates an empty neighbor list, and a ranking reflection block 240 generates a new neighbor list by applying the ranking to the existing neighbor list. The neighbor list reading block 230 and the ranking reflection block 240 constitute a neighbor list generation block.

The ranking reflection block 240 can generate a new neighbor list by partially applying the ranking to the existing neighbor list at the discretion of a user. If it is desired to reduce a handover ratio to a particular target base station, even though the particular target base station has a high ranking, the user can reflect the target base station's ranking in a new neighbor list as a low ranking or deselect the ranking from the new neighbor list.

The new neighbor list is preferably updated and stored in the neighbor list database 250 by a generation block 245. The neighbor list database 250 stores neighbor lists for all base stations managed by the URM.

The preferred embodiment of the present invention has several advantages. Since the cellular mobile communication system determines rankings in the neighbor list by reflecting actual handover statistical data, the invention can reduce overhead due to cell searching in performing handover. In addition, the method and apparatus described in the preferred embodiment of the present invention provides operator screens for performing handover ranking extraction and neighbor list reflection functions, which contributes to the convenience of operation.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for generating a handover neighbor list in a cellular mobile communication system, the method comprising:
   collecting and storing handover statistical information in a universal mobile telecommunication service radio access network manager (URM) from base stations for handover from a source base station to target base stations, wherein the handover statistical information comprises at least one of a handover attempt count and a handover ratio;
   selecting a ranking criterion from the handover statistical information;
   determining rankings of target base stations in order of handover frequency from the base station according to the selected ranking criterion; and
   generating a neighbor list, displayed on a graphic user interface of a display screen according to the selected ranking criterion, comprising target base stations in order of the selected ranking criterion of at least one of the handover attempt count and the handover ratio.

2. The method of claim 1, wherein the ranking determination step comprises determining rankings of the target base stations in order of high handover attempt count.

3. The method of claim 1, wherein the ranking determination step comprises determining rankings of the target base stations in order of high handover ratio.

4. The method of claim 1, wherein the neighbor list generation step comprises generating a new neighbor list by partially applying the rankings to a previously generated neighbor list.

5. The method of claim 1, wherein the URM comprises a wideband code division multiple access (WCDMA) modulation scheme.

6. The method of claim 1, wherein the handover attempt count comprises a number of times a mobile terminal, in communication with a source base station, attempts handover to a target base station.

7. The method of claim 1, wherein the handover ratio comprises a ratio of a mobile terminal communicating with a corresponding base station performing handover to a target base station.

8. An apparatus for generating a handover neighbor list in a cellular mobile communication system, the apparatus comprising:
- a universal mobile telecommunication service radio access network manager (URM) for periodically collecting and storing handover statistical information from base stations for handover from a source base station to target base stations, wherein the handover statistical information comprises at least one of a handover attempt count and a handover ratio;
- a handover analysis block of the URM for selecting a ranking criterion from the handover statistical information and determining rankings of target base stations in order of handover frequency from the base station according to the selected ranking criterion; and
- a neighbor list generation block displayed on a graphic user interface of a display screen according to the selected ranking criterion for generating a neighbor list comprising target base stations in order of the selected ranking criterion of at least one of the handover attempt count and the handover ratio.

9. The apparatus of claim 8, wherein the handover analysis block determines rankings of the target base stations in order of high handover attempt count.

10. The apparatus of claim 8, wherein the handover analysis block determines rankings of the target base stations in order of high handover ratio.

11. The apparatus of claim 8, wherein the neighbor list generation block generates a new neighbor list by partially reflecting the rankings to a previously generated neighbor list.

12. The apparatus of claim 8, wherein the URM comprises a wideband code division multiple access (WCDMA) modulation scheme.

13. The apparatus of claim 8, wherein the handover attempt count comprises a number of times a mobile terminal, in communication with a source base station, attempts handover to a target base station.

14. The apparatus of claim 8, wherein the handover ratio comprises a ratio of a mobile terminal communicating with a corresponding base station performing handover to a target base station.

* * * * *